Oct. 13, 1970 A. BALINT 3,533,693

FILM PRINTER CONTROL CIRCUIT

Filed Aug. 17, 1966 5 Sheets-Sheet 1

INVENTOR.
Andrew Balint
BY
Griffin and Branigan
Attys

Oct. 13, 1970 A. BALINT 3,533,693

FILM PRINTER CONTROL CIRCUIT

Filed Aug. 17, 1966 5 Sheets-Sheet 2

INVENTOR.
Andrew Balint
BY
Griffin and Branigan
Attys

Oct. 13, 1970

A. BALINT 3,533,693

FILM PRINTER CONTROL CIRCUIT

Filed Aug. 17, 1966

5 Sheets-Sheet 3

INVENTOR.
Andrew Balint.
BY
Griffin and Branigan
Attys

Oct. 13, 1970 A. BALINT 3,533,693

FILM PRINTER CONTROL CIRCUIT

Filed Aug. 17, 1966 5 Sheets-Sheet 4

INVENTOR.
Andrew Balint.
BY
Griffin and Branigan
Attys

INVENTOR.
Andrew Balint
BY
Griffin and Branigan
Attys

United States Patent Office 3,533,693

Patented Oct. 13, 1970

3,533,693

FILM PRINTER CONTROL CIRCUIT

Andrew Balint, Park Ridge, Ill., assignor to Bell & Howell Company, Chicago, Ill., a corporation of Illinois Filed Aug. 17, 1966, Ser. No. 573,083
Int. Cl. G03b *27/76*
U.S. Cl. 355—71 15 Claims

ABSTRACT OF THE DISCLOSURE

A tape controlled photographic film printer having control means for controlling the reading of correction data from the tape. The correction data is recorded in sets with the red, green and blue correction data for a set being recorded sequentially on the tape. The correction data is read from the tape prior to its actual use and is stored in a memory device. It is then immediately available to set light vanes when needed.

During the printing of developed motion picture film on raw film stock, various corrections must be made from scene to scene to compensate for such well known factors as film density and color balance. One type of light modulating means suitable for this purpose includes three dichroic mirrors for separating a light source into three primary color light beams. The light modulating means also includes three light valves each controlling a vane or shutter which may be adjustably set to intercept a predetermined portion of the light in one of the primary color beams. After the primary color beams pass through the light valves they are recombined and directed through an aperture and a color transparency so as to impinge on raw film stock.

Each light valve includes a ball-type adder unit having a plurality of solenoid actuated slides. Signals representing correction factors are applied to the slide solenoids thereby causing the adder unit to expand linearly by an amount which depends upon which slide solenoids are actuated. This linear expansion is converted into angular rotation of a vane cam. The angular position of the vane cam is subsequently sampled by actuating a vane solenoid which in turn moves a vane into the path of the primary color beam by an amount determined by the angular position of the vane cam.

An object of the present invention is to provide novel control circuit means for controlling and actuating light valves of the type described above.

Generally speaking, changes in the lighting conditions occur between scenes thus requiring that the settings of the vanes or shutters be changed between the time the last frame of one scene is printed and the first frame of the next scene is printed. Heretofore, the printing speed has been limited because of the time required to sense the data relating to correction factors for a new scene and set the vane in a position corresponding to the correction data.

An object of this invention is to provide circuit means for storing in a light valve the correction data relating to the next scene while at the same time maintaining the vane of the light valve in a position corresponding to the correction required for the present scene. This greatly increases the printing speed since the correction data of the next scene is stored in the light valve ready for immediate use as soon as the signal indicating the beginning of the scene is received.

Another object of the invention is to provide a novel control circuit for a film printer, said circuit including a timing pulse generator, a tape reader and a counter circuit operating under the control of the timing pulse generator, and memory means operating in response to the tape reader and the counter for changing the settings of light valves. As is conventional in film printers, some form of indicia such as a notch is recorded on the film strip being printed from so as to produce a cue signal indicating a change from one scene to the next. Since a scene may include any number of frames it is obvious that the time elapsing between successive cue signals may vary considerably. Furthermore, since the light valve setting is changed between scenes it is desirable that the timing pulse generator operate only intermittently. On the other hand, design considerations require that the timing pulse generator operate continuously for a certain period of time when the film printer is first started.

A feature of the present invention is the provision of a timing pulse generator which may produce a sequence of pulses containing a variable number of individual pulses when the film printer is initially started, but produces a burst of only four pulses in response to each cue signal. This is accomplished by the provision of a novel feedback loop including a digital counter. The counter is initially reset and applies no input signal to the timing pulse generator. When the timing pulse generator is pulsed by a cue signal it produces an output signal which is counted by the counter. As long as there is a count in the counter the counter applies a feedback signal to the timing pulse generator to keep it running. Every fourth output pulse from the timing pulse generator resets the counter thus removing the feedback signal from the input to the timing pulse generator. This stops the timing pulse generator and it remains at rest until the next cue signal initiates another sequence during which four more timing pulses are generated.

Each pulse produced by the timing pulse generator is applied to a tape reader escapement solenoid to advance the tape one step. Data representing the desired settings of the light valves is recorded as perforations in the tape. One row of perforations relates to the desired setting of the red light valve, the next row relates to the desired setting of the green light valve, and the third row relates to the desired setting of the blue light valve. Successive clock pulses step the reader from one row of perforations to the next and signals representing the perforations sensed are stored in a red, a green, and a blue memory under the control of pulses from the counter. Obviously, if the tape reader should get out of step with the counter the information relating to the desired setting of one light valve may be stored in the memory which controls another light valve. The error might go unnoticed until the exposed raw film stock has been developed. To avoid loss of raw film stock as a result of this condition, the present invention includes as one feature the provision of means for stopping the film printer if the counter should get out of sequence with the tape reader.

Other objects of the invention and its mode of operation will become apparent upon consideration of the following description and the accompanying drawings in which.

Figures 1, 2, 3A, 3B, 3C, 4C:
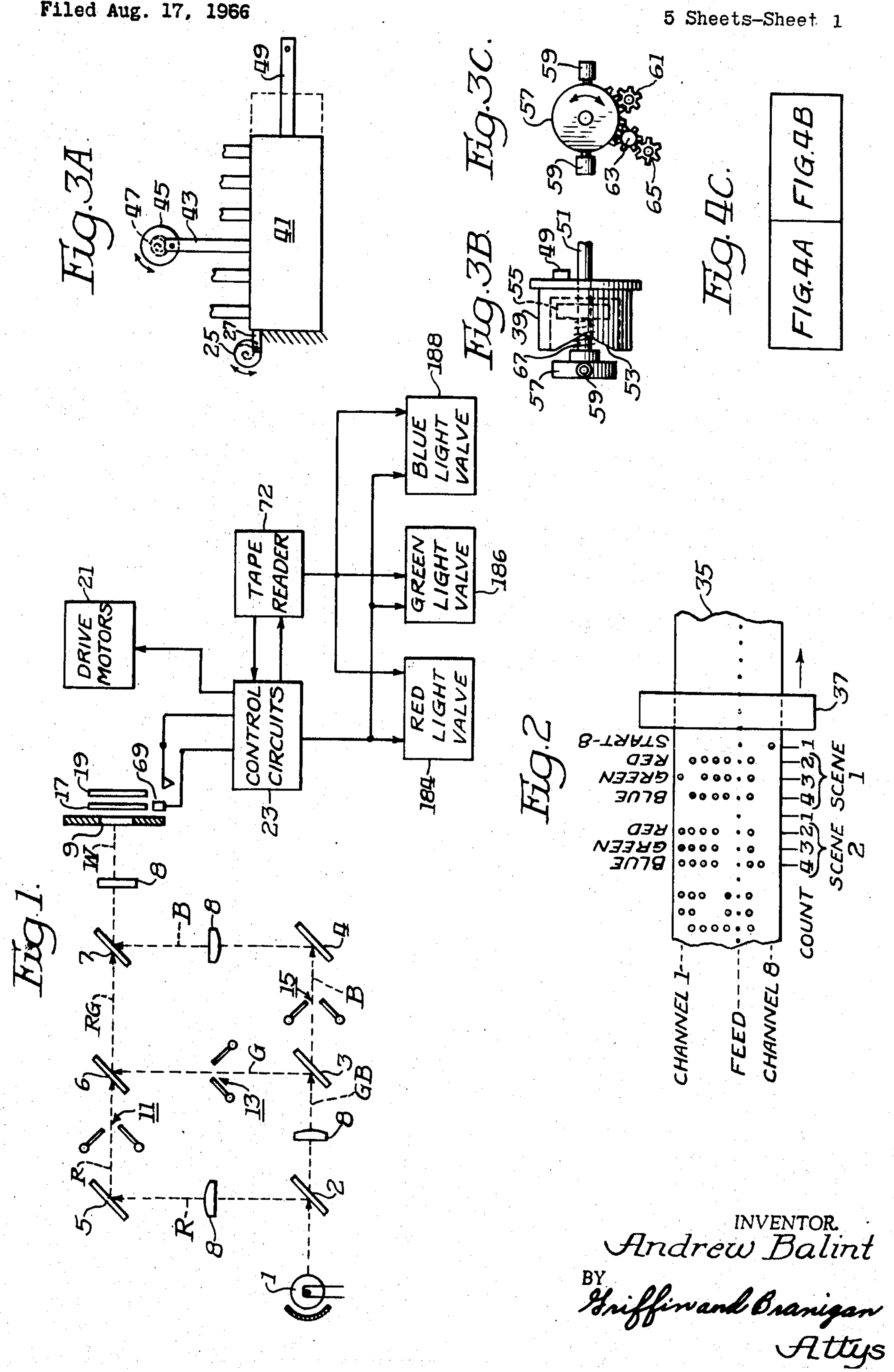
FIG. 1 is a schematic diagram of a color printer system employing the present invention.
FIG. 2 shows the format of a typical program tape.
Figure 4A:
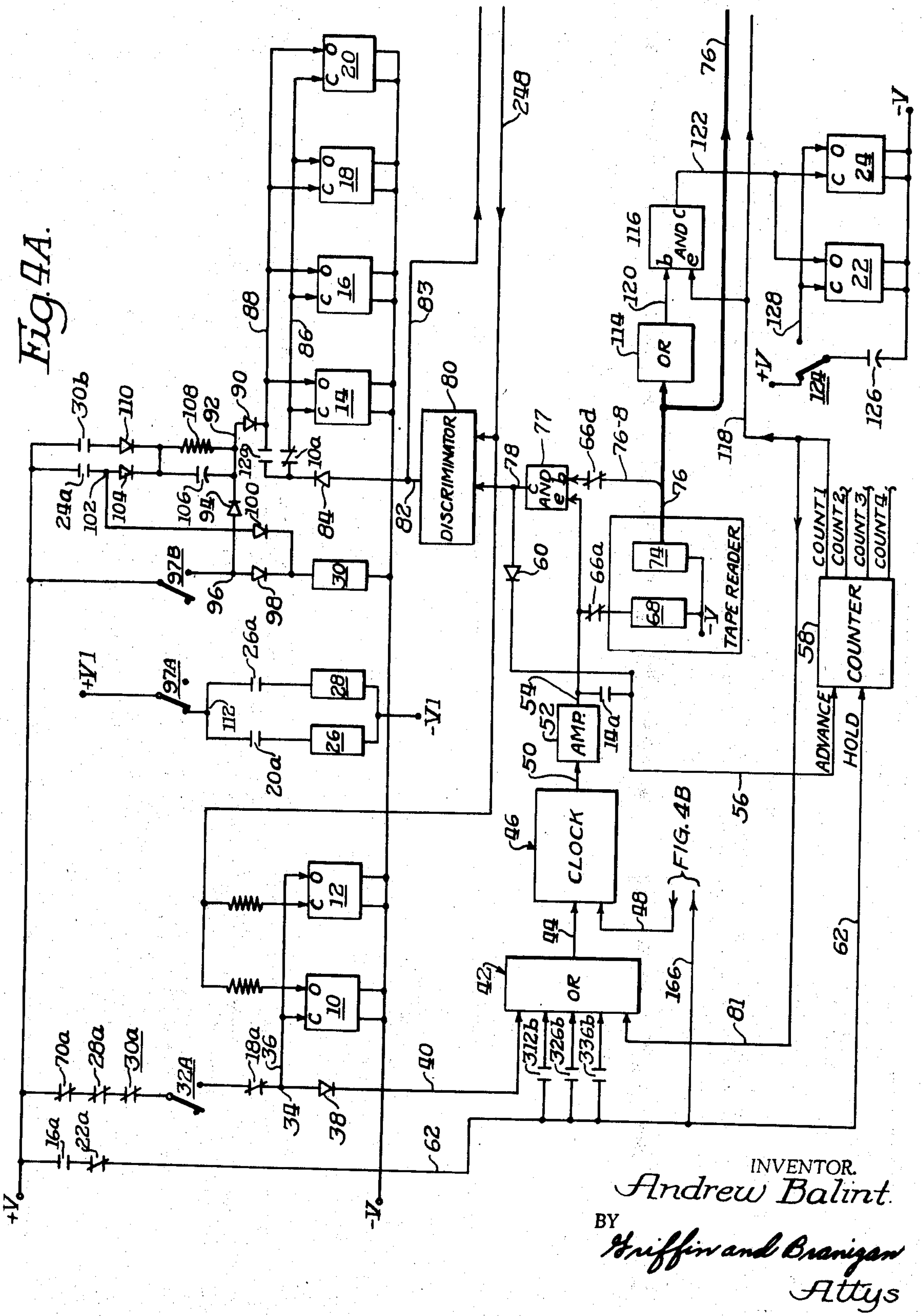
Figures 4A, 4B:
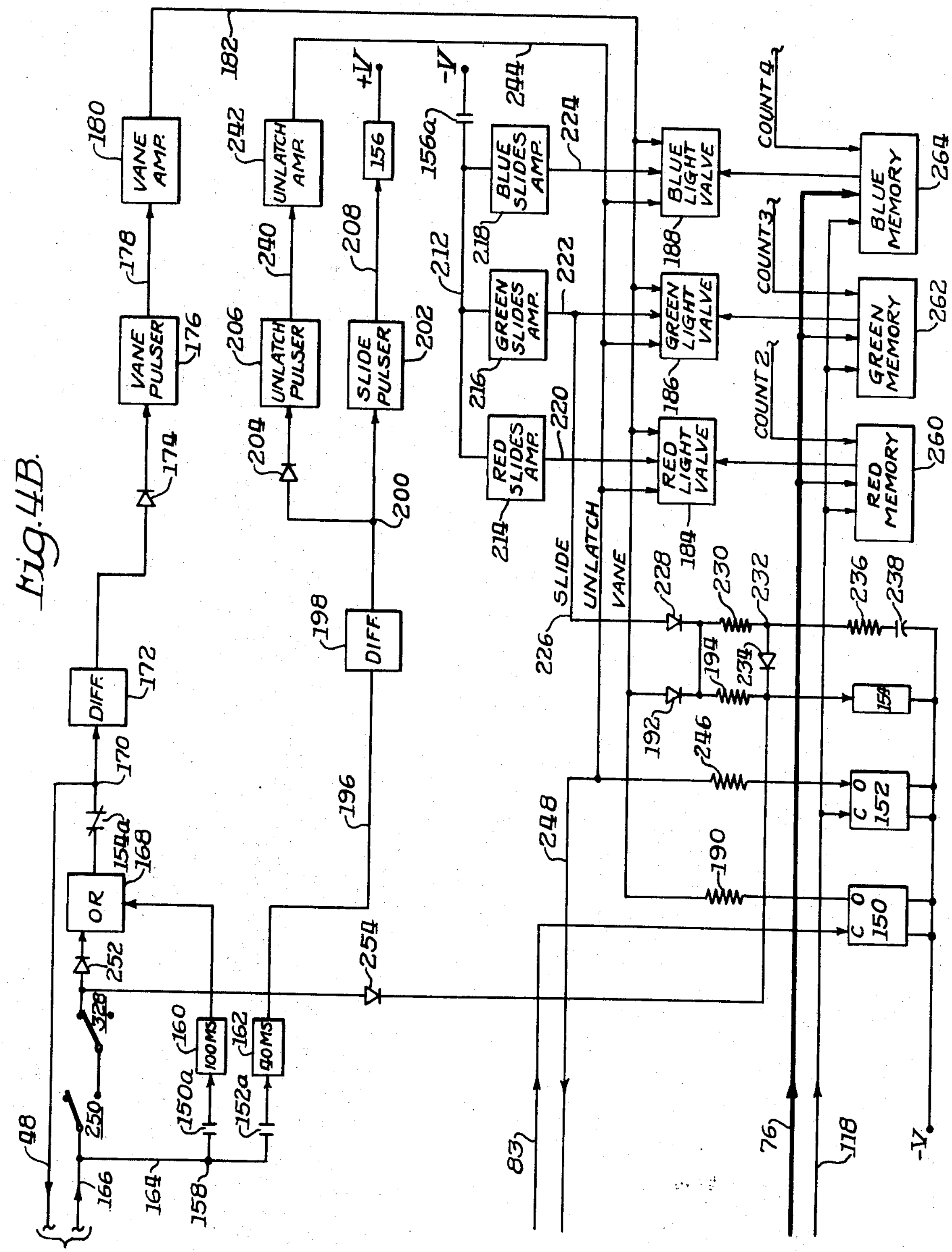
Figure 5:
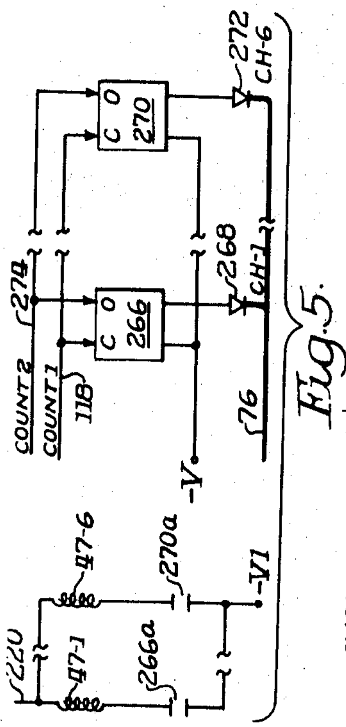
Figure 7:
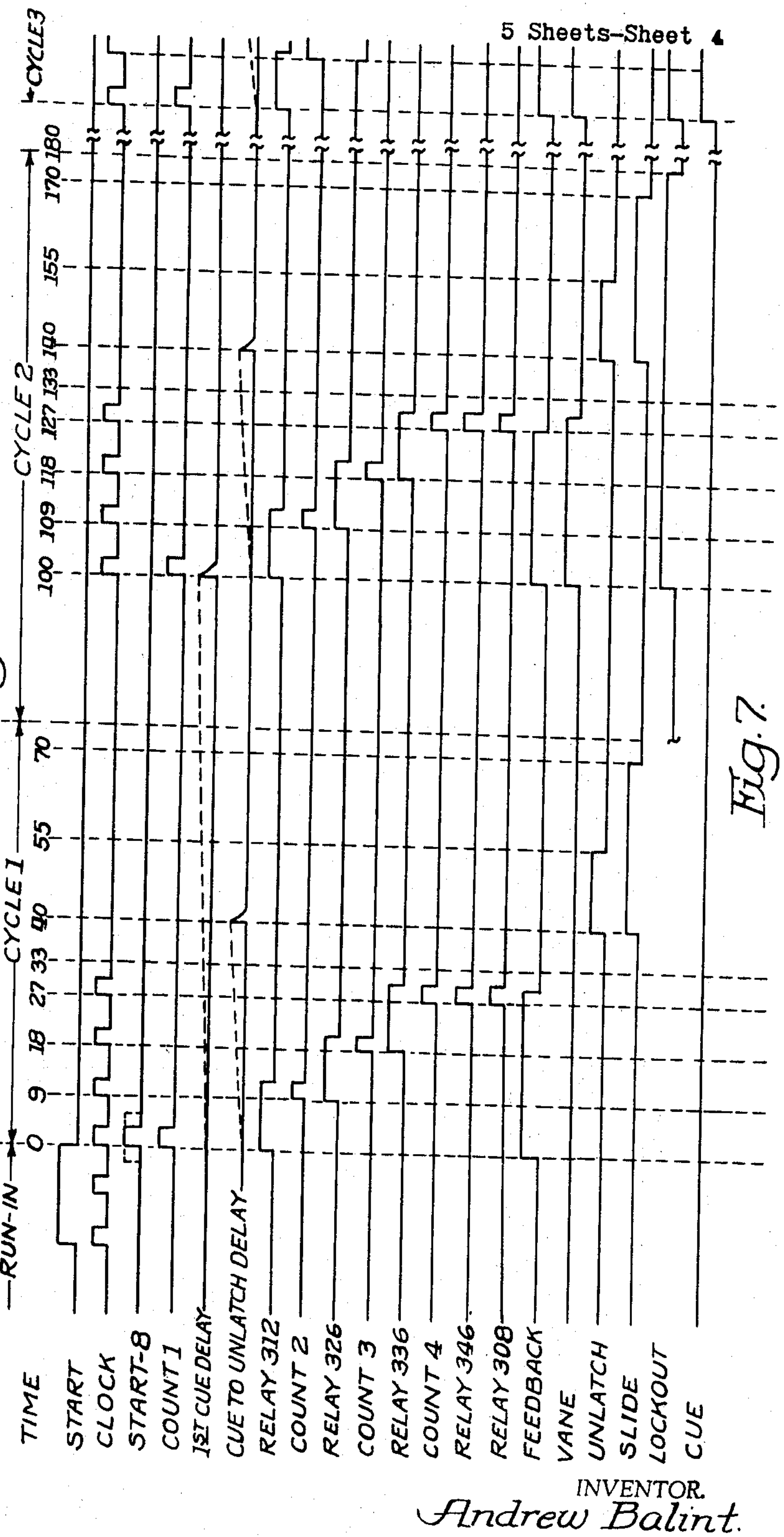
Figure 6:
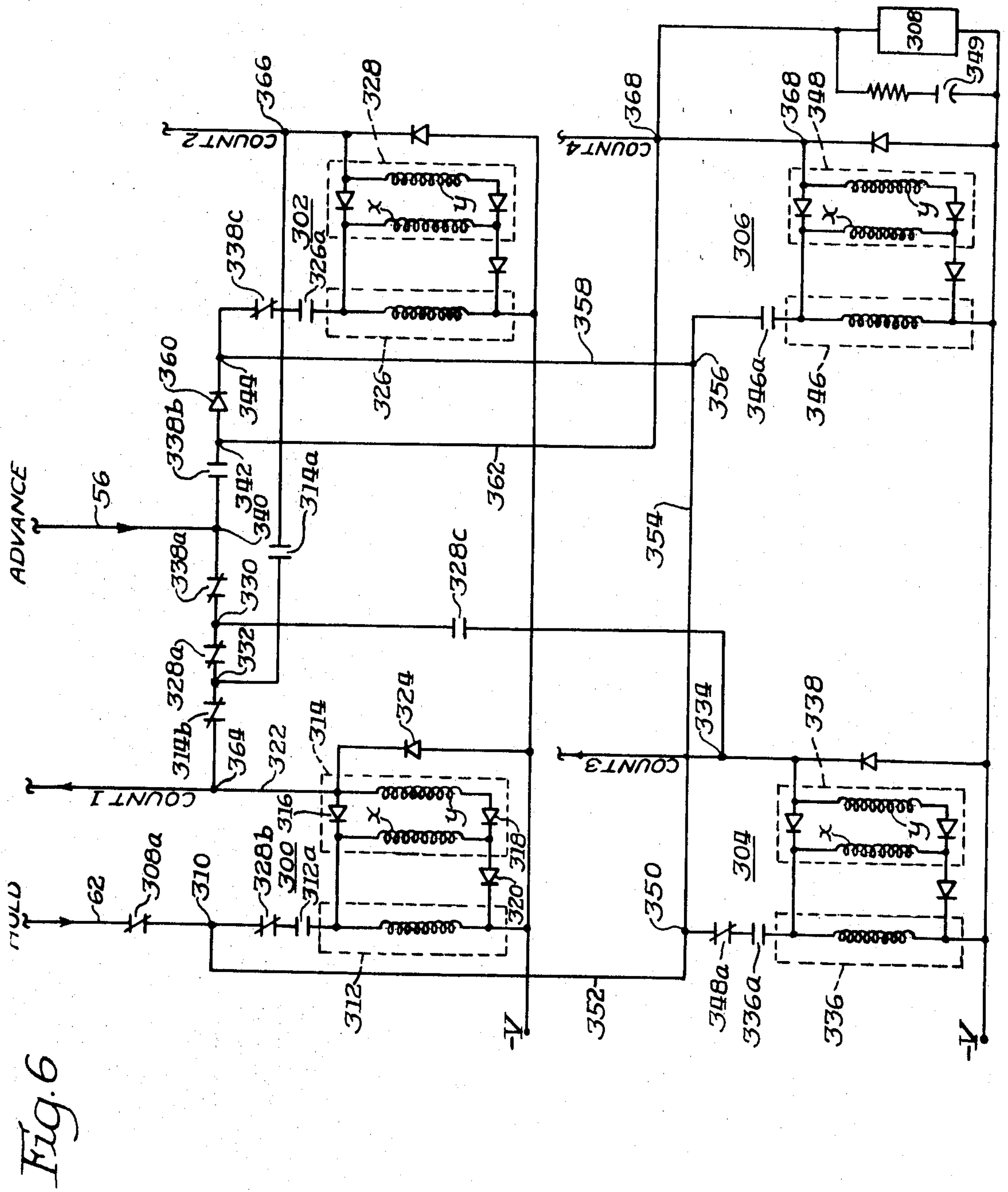

FIG. 3A schematically illustrates a ball-type adder;

FIG. 3B illustrates details of the vane cam;

FIG. 3C illustrates the vane armature and vane cam follower;

FIGS. 4A and 4B when arranged as shown in FIG. 4C form a block diagram of the invention;

FIG. 5 shows a portion of the circuit for the red memory;

FIG. 6 is a circuit diagram showing details of a counter circuit; and,

FIG. 7 is a timing diagram illustrating the relative times of occurrence of certain signals generated by the circuit shown in FIGS. 4A and 4B.

GENERAL DESCRIPTION

The present invention is admirably suited for use in an additive color printer system such as that schematically illustrated in FIG. 1. The optical portion of the system includes a lamp or other light source 1, six dichroic mirrors 2 through 7, a suitable lens system represented by lens elements 8, an aperture 9, and three sets of vanes 11, 13, and 15.

White light from source 1 is directed toward dichroic mirror 2. This mirror reflects red light in a beam designated R and transmits green and blue light in a beam designated GB. Dichroic mirror 3 reflects the green light in the beam GB and transmits the blue light. Thus, the beam of white light is broken up into three primary color beams red, green, and blue.

The red light reflected from mirror 2 is reflected again at mirror 5 so as to travel through vane 11 to mirror 6. Means subsequently described are provided for varying the setting of vane 11 thus varying the cross-sectional area of the red beam.

The green light reflected by mirror 3 passes through vanes 13 to the mirror 6 and means are provided for adjusting the vanes 13 to vary the cross-sectional area of the beam passing through them. Dichroic mirror 6 reflects green light and transmits red light so the red and green beams are combined at mirror 6 and transmitted to mirror 7.

The blue light beam transmitted by mirror 3 passes through vanes 15 and is reflected at mirror 4 toward mirror 7. The vanes 15 are adjustable so as to vary the cross-sectional area of the blue light beam.

Mirror 7 reflects the blue light beam and transmits the red and green light beam hence the light beam output from mirror 7 is a white light beam that is color and intensity corrected according to the settings of the vanes 11, 13, and 15. The corrected beam is directed through aperture 9 and a film strip 17 onto raw film stock 19. The film strip 17 may be any transparency but for the purpose of distinguishing it from the raw film it is hereinafter referred to as a negative.

The negative 17 and the raw film stock 19 are moved past the aperture 9 by a suitable transport system (not shown) which is driven by drive motors 21. The drive motors are energized by control circuits 23 which control the starting and stopping of the drive motors, the step-by-step advance of a tape through a tape reader 72, and the setting of three light valves 184, 186, and 188 in accordance with correction data sensed from the tape. The light valves 184, 186, and 188 control the positioning of the vanes 11, 13, and 15, respectively.

FIG. 2 shows a typical program tape 35 suitable for use in the tape reader. The tape has eight channels of perforations extending along the length of the tape. Correction data relating to corrections required during the printing operation is arranged as a sequence of characters with each character comprising one row of perforations extending transverse to the direction of tape movement. Each character may comprise perforations in none, one, or more of the tape channels. The perforations in channels 1 through 6 represent correction data and perforations in channel 8 represent a Start-Stop signal. Punches in channel 7 are used to control a fading apparatus. The fading apparatus is not shown or described and forms no part of the present invention.

The leader portion of the tape 35 is blank and contains no perforations in any of the channels. This portion of the tape is the first to feed under a set of eight star wheels 37 as the film printer system is placed in operation. When a start switch in the control circuits 23 of FIG. 1 is closed, the control circuits pulse the tape reader to advance the tape in a step-by-step fashion. This continues until the first hole is sensed in the program tape. This is always a Start-8 hole punched in channel 8. When the channel 8 star wheel contact senses this hole the tape reader feeds a signal to the control circuits 23. The control circuits start the drive motors 21 and perform an automatic sequence during which a clock pulse generator produces two sequences of four clock pulses to advance a counter through two complete cycles.

On each cycle the counter produces four output pulses designated Count 1, Count 2, Count 3, and Count 4. Each pulse advances the tape in the tape reader by one step and conditions circuits so that the data sensed from the tape can be used to set the light valves 184, 186, and 188.

As shown in FIG. 2, the red correction data is read from the tape when the counter is at Count 2, the green correction data is read from the tape when the counter is at Count 3, and the blue correction data is read from the tape when the counter is at Count 4. This data is used to set the angular position of a vane cam 39 (FIG. 3B) which is in each light valve.

Referring now to FIGS. 3A–3C, each of the three light valves includes a conventional ball-type adder unit 41 having six slides 43. The slides have camming surfaces arranged such that the adder unit expands linearly by an amount determined by which slides are in the downward position. Each slide is moved to the downward position by energizing a rotary solenoid 45. For the sake of simplicity the drawing shows the slide solenoid for only one slide. Signals produced by sensing holes in the tape are used (indirectly) to energize the rotary slide solenoids and move them downwardly where they are latched by a mechanism not shown. The latching mechanism is operated by a single unlatch solenoid 25 which controls all six slides.

A coil spring 47 returns the slide and solenoid to its upward position when the solenoid is no longer energized. However, the unlatch solenoid must be activated before this can take place.

The linear movement of the ball adder is communicated through a suitable linkage 49 to the vane cam 39 of FIG. 3B. The vane cam is rotatable about a shaft 51 in response to movement of linkage 49 and has a V-shaped cam surface 53. The vane cam has a hollow central portion which contains a vane solenoid 55.

A vane solenoid armature 57 is affixed to the shaft 51 and the shaft 51 is free to revolve with the armature. The armature supports a pair of cam followers or rollers 59 and carries a gear sector which drives a first gear 61 and through an idler 63 drives a second gear 65. Gears 61 and 65 are mounted on and drive two shafts. The vane elements of one of the vanes 11, 13, or 15 are mounted on these shafts, one vane element on each shaft.

The linear movement of the ball adder is transmitted through linkage 49 to set the angular position of vane cam 39. The angular position of the vane cam is sensed to set positions of vanes 11, 13, or 15 controlled by the light valve. This is accomplished by applying a vane signal to the vane solenoid 55 thereby attracting the armature 57. As the armature is attracted the rollers 59 engage the cam surface 53. The rollers roll along the cam surface to the low point of the surface thus rotating the armature 57. As the armature rotates the gear sector on the armature rotates gear 61 in one direction and the gear 65 in the opposite direction thus opening or closing the vane elements driven by these gears. A spring 67 disengages the cam rollers from the cam surface as soon as the vane signal applied to the vane solenoid 55 is terminated. However, the armature 57 does not rotate during disengagement hence the armature and therefore the vanes maintain the position determined by the setting of the vane cam.

As previously stated, on the start operation the control circuits including the counter therein automatically go through two complete cycles. As explained subsequently in greater detail, the red, green, and blue correction data relating to scene 1 is read from the tape during Counts 2, 3, and 4 of the first cycle and applied to the slide solenoids in the red, green, and blue light valves to set the angular position of the three vane cams 39. However, the vanes 11, 13, and 15 are not set until Count 1 time of the second cycle when a vane signal is applied to each of the vane solenoids 55. At this time the vanes 11, 13, and 15 are set to the desired positions for printing scene 1.

While scene 1 is being printed and, more specifically, during Counts 2, 3, and 4 of the second cycle. the red, green, and blue correction data relating to scene 2 is read from the tape and used to set the vane cams.

After Count 4 of the second cycle, the control circuits produce no further output signals to advance the tape and read the correction data therefrom. The drive motors remain energized thus driving the negative and raw film stock past the aperture so that successive frames of scene 1 are printed.

The negative 17 is marked in some manner, such as, for example notching, to indicate the end of one scene and the beginning of the next scene. A microswitch 69 (FIG. 1) senses these notches and applies a cue signal to the control circuits 23 each time there is a change of scene. As explained subsequently, each cue signal causes the control circuits to go through one cycle and then halt. At Count 1 time, a signal is applied to each vane solenoid thus attracting the armatures and setting the vanes 11, 13, and 15 in accordance with the angular positions of the vane cams 39. On Counts 2, 3, and 4, the correction data relevant to the next scene is read from the tape and used to set the angular positions of the vane cams. These positions are maintained until the next cue signal is produced by the microswitch.

From the above description, it is obvious that the correction data relating to a particular scene is read from the tape and stored as angular positions of the vane cams while the preceding scene is being printed. When a cue signal occurs indicating a change of scene, the positions of the vanes 11, 13, and 15 are changed merely by pulsing the vane solenoids. Thus, increased operating speed is attained because no time is lost waiting for the tape reader to sense the correction data relating to the next scene to be printed.

CIRCUIT DESCRIPTION—FIGS. 4A AND 4B

The primary control circuits of the film strip printer are shown in FIG. 4A and include a plurality of bistable relays 10, 12, 14, 16, 18, 20, 22, and 24. Each of these relays is a reed contact relay having a first coil designated the "close" coil which may be energized by pulsing an input terminal designated C, and a second coil designated the "open" coil which may be energized by pulsing an input terminal designated O. Each relay has a set of contacts and the permanent magnet biasing means associated therewith. The biasing means holds the contacts in the closed position once the close coil has been energized to close them. Consider, for example, the relay 10 which has a single set of normally closed contacts **10*a*. A pulse applied to the input terminal C of relay 10 energizes the close coil of the relay, thus closing the contacts 10*a*. When the contacts 10*a*** close, the permanent magnet biasing means establishes a magnetic circuit through the contacts to hold them in the closed position even after the input pulse to the close coil is terminated. The relay contacts may be opened by applying a pulse through relay terminal O to energize the open coil of the relay. Current flowing through the open coil generates a magnetic field which cancels the permanent magnet biasing field, thus permitting the relay contacts to open. The permanent magnet biasing field alone is insufficient to close the relay contacts once they have been opened. Thus, the relay contacts remain open even after the input pulse to the open coil is terminated. The contacts may again be closed by applying a second pulse to the close coil of the relay.

Relays 10, 18, and 22 each have a single set of normally closed contacts designated **10*a*, 18*a*, and 22*a*, respectively. Relays 12, 14, 16, 20, and 24 each have a single set of normally open contacts designated 12*a*, 14*a*, 16*a*, 20*a*, and 24*a***, respectively.

The control circuits of FIG. 4A also include three single coil relays 26, 28, and 30. These are conventional relays having contacts which are transferred only during the time that a signal is applied to the relay coil. Relay 26 has a set of normally open contacts **26*a*, and relay 28 has a set of normally closed contacts 28*a*. Relay 30 has a set of normally closed contacts 30*a* and a set of normally open contacts 30*b***.

In addition to the relay contacts enumerated above, FIG. 4A also shows three sets of normally closed relay contacts designated **66*a*, 66*d*, and 70*a***. These contacts are operated only when certain error conditions occur and for purposes of explaining the present invention it may be assumed that these contacts are always closed.

Relay contacts **70*a*, 28*a*, and 30*a* are connected in a series circuit extending from the positive side of the power supply (+V) to the common terminal of a set of start switch contacts 32A. The start switch contacts are transferred by depressing a start button on the control panel of the printer and they remain transferred only as long as the start button is depressed. The normally open terminal of contacts 32A is connected through relay contacts 18*a* to a junction 34. Junction 34 is connected by means of a lead 36 to the close coil of relay 10 and the open coil of relay 12**.

The junction 34 is also connected through a diode 38 and a lead 40 to one input of a conventional diode OR gate 42. The output of the OR gate is connected by means of a lead 44 to the input of a timing pulse generator or clock 46. The clock also receives signals over a second input lead 48. These signals are produced in FIG. 4B as subsequently described.

The clock 46 may be any conventional circuit which acts as a free running multivibrator as long as a positive signal is applied to one of the inputs 44 or 48. When neither lead 44 nor 48 has a positive signal thereon the clock produces no output pulses. Preferably, the clock produces negative output pulses of three milliseconds duration with consecutive pulses being separated from each other by a time interval of 6 milliseconds. Output pulses from the clock are applied over a lead 50 to an amplifier 52 which may be a transistor amplifier of conventional design. The amplifier also inverts the pulses hence the amplified clock pulses appear as a sequence of positive pulses at the output of the amplifier.

The output of amplifier 52 is connected by lead 54 to one terminal of normally open relay contacts **14*a* and the other terminal of these contacts is connected by way of a lead 56 to a counter 58. The lead 54 is also connected to one input of an AND gate 77 and the output of this AND gate is connected through a diode 60 to the lead 56**.

The details of counter 58 are subsequently described in detail. However, it may be noted at this point that the counter has four stages each including a plurality of relays. Each pulse appearing on the lead 56 advances the count in the counter by turning one stage "ON" and turning the preceding stage "OFF." Normally open relay contacts **16*a*, normally closed relay contacts 22*a*, and lead 62 form a series circuit for connecting +V to a second input of the counter. The purpose of this input is to hold a relay stage on until it is turned off by the next advance pulse on lead 56**.

Each pulse appearing on the lead 56 filters through relay contacts in the counter and appears on one of the output leads designated Count 1, Count 2, Count 3, and Count 4 depending on the count in the counter. The relays in the counter also control three sets of normally open contacts **312*b*, 326*b* and 336*b* which are connected between the lead 62 and three inputs of the OR gate 42. The purpose of these contacts is to apply a positive voltage through the OR gate 42 to the clock 46 thus keeping the clock running as long as there is a count in the counter. As subsequently explained, circuits within the counter cause it to be reset to a zero or no count condition after reaching Count 4**.

The amplified clock pulses appearing on lead 54 are also applied through normally closed relay contacts **66*a* to a forward escapement solenoid 68 in the tape reader 72. The tape reader may be any reader suitable for reading perforated tapes such as the one shown in FIG. 2 and may, for example, be a Model 1674 perforated tape reader manufactured by Tally Corporation. Since the tape reader is conventional, the drawing shows only those elements of the tape reader necessary for an understanding of the present invention. These elements include the forward escapement solenoid 68, and a set of tape sensing contacts generally designated by the reference numeral 74**.

The escapement solenoid controls the step-by-step advance of the tape through the tape reader. Each time a three millisecond clock pulse appears at the output of amplifier 52 it is applied to the escapement solenoid to disengage an armature from an escapement wheel. Each time the armature is disengaged from the escapement wheel the tape advances the distance between two characters on the program tape.

The tape reader includes eight four-point star wheel sensors, one for sensing the perforations in each of the eight channels on the tape. A movable contact associated with each star wheel is normally open as long as no perforation is sensed by the star wheel. When a perforation is sensed by one of the star wheels a point on the star wheel drops into the perforation thus permitting the movable contact to close. Each movable contact is connected between the negative side of the power supply (−V) and one of eight leads in an output cable 76. Thus signals representing perforations in the tape appear on the output cable 76 as negative signals. As will become evident from the subsequent description, each pulse which pulses the escapement solenoid 68 of the tape reader also samples the output signals on the cable 76. Because of the time delay inherent in the mechanical escapement operation it is possible to sample the signals on the cable 76 before the escapement actually occurs. Thus, no current is flowing through a star wheel contact and cable 76 at the instant the star wheel contacts transfer. This prevents arcing and burning of the contacts.

The channel 8 lead in cable 76 is designated 76–8. This lead is connected to one terminal of normally closed contacts **66*d* and the other terminal of these contacts is connected to an input of AND gate 77. This AND gate may be a transistor circuit comprising a single transistor having its base connected to the contact 66*d* and its emitter connected to the lead 54. Output signals are taken off the collector and appear on a lead 78. Since each positive clock pulse appearing on lead 54 is applied to the emitter input of the AND gate and since a negative signal is applied to the base input whenever the channel 8 star wheel contact is closed, the AND gate produces a positive output signal on lead 78 only when an 8** hole is sensed in the tape.

The lead 78 connects the output of AND gate 77 to the input of a discriminator circuit 80. The purpose of this circuit is to insure that a forward program tape is in the tape reader when the film strip printer has been set to feed the film strip in the forward direction, or a reverse program tape is in the tape reader when the film strip printer has been set to feed in the reverse direction. The discriminator merely detects errors on the part of the human operator and stops the tape reader when an error is detected. The discriminator is disclosed and claimed in a copending application and forms no part of the present invention. For purposes of the present description it is sufficient to assume that there is a direct connection through the discriminator so that any signal applied to the discriminator over lead 78 appears on the lead 82 at the output of the discriminator. The relay contacts **66*a*, 66*d*, and 70*a*** are all controlled by relays in the discriminator and as previously stated it may be assumed that these contacts always remain closed.

The output lead 82 of the discriminator is connected through a diode 84 to one terminal of each set of relay contacts **10*a* and 12*a*. The other terminal of contacts 10*a* is connected by way of a lead 86 to the close coil of relays 14, 16, and 20 and the open coil of relay 18. The other terminal of contacts 12*a* is connected by way of a lead 88 to the open coils of relays 14, 16, and 20 and the close coil of relay 18**.

A positive signal on the lead 88 stops the film strip printer. The stop signal may reach the lead 88 through relay contacts **12*a* or through a diode 90. The diode 90 is connected through a lead 92 and a diode 94 to a junction point 96. The junction point 96 is connected to the normally opened contact of a set of stop switch contacts 97B and the operating terminal of these contacts is connected to +V. The junction 96 is also connected through a diode 98 to a relay 30. The coil of relay 30 is also connected through a diode 100 to a junction point 102 and from this point through the normally open relay contacts 24*a* to +V. The junction 102 is also connected through a diode 104 and a capacitor 106 to the lead 92. A resistor 108 is connected in parallel with the capacitor. The resistor-capacitor circuit is also connected through a diode 110 and relay contacts 30*b*** to +V.

A stop button is provided on the control panel of the film strip printer. This stop button actuates stop switch contacts 97A and 97B. The contacts remain transferred only as long as the stop button is depressed. The operating terminal of stop switch contacts 97A is connected to a power supply designated +V1. The terminal of the normally closed contact 97A is connected to a junction 112. The junction 112 is connected through normally open relay contacts **20*a* to the coil of relay 26, and through normally open relay contacts 26*a* to the coil of relay 28**.

The relays 26 and 28 are the only relays in FIG. 4A which operate from the +V1 power supply. These relays have additional contacts which are not shown in the drawing but which are in the circuits for energizing the driving motors in the film strip printer. Unless the relays 26 and 28 are energized the driving motors in the film strip printer will not move the negative and the raw film stock.

As previously explained, if a program tape is properly prepared it contains no perforations in channels 1 through 7 for those positions of the tape that are read at times corresponding to Count 1 of the counter. If a perforation is sensed in any of the channels 1 through 7 at Count 1 time it means that the tape is no longer in synchronism with the counter. Since each data character read from the tape is used to control a first, a second, or a third light valve depending upon whether the count in the counter is 2, 3, or 4, it follows that the data for setting one light valve may be erroneously directed to another light valve if synchronism between the tape and the counter is lost. This of course means that the light valves would be improperly set and the raw film stock improperly exposed, thus ruining the stock.

An out of sequence detection means is provided for detecting when the counter is not in synchronism with the tape. The detecting means includes an OR gate 114 and an AND gate 116. The AND gate 116 may be a transistor circuit similar to the AND gate 77 previously described. The emitter of the transistor is connected by way of a lead 118 to the Count 1 output of counter 58. The base of the transistor is connected by a lead 120 to the OR gate 114. The OR gate comprises seven diodes each having one terminal connected to the lead 120. The leads in cable 76 which are connected to the star wheel contacts for channels 1 through 7 are also connected to the other terminal of individual ones of the diodes. The diodes are poled so that the voltage −V may be applied through the OR gate to the base input of the AND gate 116 when one or more of the star wheel contacts for channels 1 through 7 is closed.

A positive signal appears at the collector output lead 122 of the AND gate only when the lead 120 is negative and the lead 118 is positive. Stated differently, a positive output signal appears on the lead 122 only if a perforation is sensed in any of the channels 1 through 7 at the time the counter is producing a Count 1 output signal. The positive signal on lead 122 represents an error condition and is applied to the open coil of relay 22 and the close coil of relay 24. These relays are the out of sequence relays and the contacts associated with them are transferred to stop the film printer and the tape reader.

A reset switch 124 is operated by a pushbutton on the control panel of the film strip printer. The normally closed contact terminal of this switch is connected to +V and the common terminal is connected through a capacitor 126 to −V. During normal operation the capacitor 126 remains charged. After an out of sequence condition has been sensed and the proper steps taken to correct the situation, the relays 22 and 24 may be reset by depressing the reset button. This transfers the contacts 124 so that the condenser 126 discharges through a lead 128 and the close coil of relay 22 and the open coil of relay 24.

The circuits of FIG. 4B include two bistable relays 150 and 152 and two single coil relays 154 and 156. Relay 150 has a single set of normally open contacts **150*a* connected between a junction point 158 and a 100 millisecond delay element 160. Relay 152 has a single set of normally open contacts 152*a* connected between the junction 158 and a forty millisecond delay element 162. The junction point 158 is connected by way of a lead 164 and a lead 166 to the lead 62** in FIG. 4A.

Relay 154 has a single set of normally closed contacts **154*a* connected between the output of a conventional diode OR gate 168 and a junction point 170. This junction point is connected by the lead 48 to an output of the clock in FIG. 4A. The junction point 170 is also connected through a differentiator circuit 172 and a diode 174 to the input of a vane pulser 176**.

The vane pulser 176 may be any conventional pulse generating means such as a single shot multivibrator which produces a negative output signal of approximately thirty milliseconds duration each time a triggering pulse is applied to its input. The negative output signals from the pulser are applied over a lead 178 to a vane amplifier 180, which amplifies and inverts them. The output of the vane amplifier is connected by way of a lead 182 to the vane solenoid and each of the three light valves 184, 186, and 188. The lead 182 is also connected through a resistor 190 to the open coil of relay 150 and through a diode 192 and a resistor 194 to the coil of relay 154.

The output of the forty millisecond delay 162 is connected by way of a lead 196 to a differentiator circuit 198 and the output of this circuit is connected to a junction 200. The junction 200 is connected to the input of a slide pulser 202 and through a diode 204 to the input of an unlatch pulser 206.

Slide pulser 202 may be any conventional pulse generator such as a single shot multivibrator for producing a single negative output signal of 30 milliseconds duration in response to each positive signal applied to its input. The output of the slide pulser is connected by way of a lead 208 to the coil of relay 156 and the other side of this coil is connected to +V. Thus, when the slide pulser produces a negative output signal a current path is established through the relay coil from +V to the negative voltage source in the slide pulser. The relay 156 has a single set of normally open contacts **156*a* connected between −V and a lead 212. The lead 212 is connected to the bases of three transistor amplifiers 214, 216, and 218**.

The amplifier 214 is the red slides amplifier and its output is connected by a lead 220 to one end of each of the six rotary slide solenoids in the red light valve. The amplifier 216 is the green slides amplifier and its output is connected by a lead 222 to one end of each of the six rotary slide solenoids in the green light valve. The amplifier 218 has an output connected by lead 224 to one end of each of the six rotary slide solenoids in the blue light valve. Furthermore, the output of any one of the slides amplifiers, for example the output 222 of the green slides amplifier, is connected through a lead 226, a diode 228, and a resistor 230 to a junction 232. The junction 232 is connected through a diode 234 to the coil of relay 154 and through a resistor 236 and a capacitor 238 to −V.

The unlatch pulser 206 may be any suitable pulse generating means such as a monostable multivibrator for producing a single negative output pulse of approximately 15 milliseconds duration in response to each triggering pulse applied to its input. The negative output pulses from the unlatch pulser are applied by way of a lead 240 to an unlatch amplifier 242 which inverts and amplifies the unlatch pulses. The output of the unlatch amplifier is connected by way of a lead 244 to the unlatch solenoid in each of the light valves 184, 186, and 188. Unlatch pulses appearing on the lead 244 are also applied through a resistor 246 to the open coil of relay 152, and over a lead 248 to FIG. 4A where they are applied to the discriminator circuit 80, the open coil relay 10, and the close coil of relay 12.

The circuit of FIG. 4B includes two sets of switch contacts 32B and 250. The contacts 32B are normally closed start switch contacts which are operated by the same start button that operates the contacts 32A shown in FIG. 4A. The contacts 250 are microswitch contacts operated by cue notches cut in the film negative to indicate a change of scenes. The common terminal of switch contacts 250 is connected to the lead 166 and the normally open terminal is connected to the common terminal of switch contacts 32B. The normally closed contact terminal of switch contacts 32B is connected through a diode 252 to one input of the OR circuit 168, and through a diode 254 to the coil of relay 154.

The count pulses produced by the counter 58 in FIG. 4A are applied to the circuits of FIG. 4B. Count 1 pulses on the lead 118 are applied to the close coil of relay 152 and the reset inputs for three relay memory devices 260, 262, and 264. Signals representing the perforations sensed in channels 1 through 6 of the tape appear on the cable 76 and are applied to each of the memory devices. Count 2 pulses from the counter gate these signals into the red memory 260 whereas Count 3 pulses gate the signals into the green memory 262 and Count 4 pulses gate the signals into the blue memory 264.

DESCRIPTION OF FIG. 5

The operation of the memory devices may be better understood by considering FIG. 5 which shows a portion of the red memory 260. The memory includes six bistable relays, one for storing an indication of a perforation in each of the tape channels 1 through 6. FIG. 5 shows only the relays responsive to signals representing perforations in channels 1 and 6. The channel 1 relay 266 has one side of its open coil connected through a diode 268 to a lead in cable 76. This lead is the one that is connected to −V through the channel 1 star wheel contact when the star wheel senses a hole in channel 1. One side of the open coil of relay 270 is connected through a diode 272 to another lead in the cable 76. This lead is the one that is connected to −V through the channel 6 star wheel contact when the star wheel for channel 6 senses a hole in the tape. The other side of the open coil of each relay is connected to a lead 274 which receives Count 2 pulses from the counter. Count 1 pulses appearing on lead 118 are applied to the close coil of each of the relays and the other side of these coils is connected to —V. Relay 266 has a single set of normally open contacts 266*a* connected between —V1 and one end of a slide solenoid 47–1. The other end of this slide solenoid is connected by the lead 220 to the red slides amplifier 214 shown in FIG. 4B. The relay 270 has a single set of normally open contacts 270*a* connected between —V1 and one end of another slide solenoid 47–6. The other end of this slide solenoid is also connected by the lead 220 to the output of the red slides amplifier.

The circuit of FIG. 5 operates as follows. On Count 1 a positive signal on lead 118 energizes the close coil of both relays 266 and 270 thus closing the contacts 266*a* and 270*a*. At the same time the Count 1 pulse occurs the clock is energizing the escapement solenoid so that the tape steps to the next position. Assume that this position contains a perforation in channel 1 but no perforation in channel 6. The channel 1 star wheel contact closes thus forming a circuit from ground through the contact and lead 76 to the diode 268. Since channel 6 contains no perforation the star wheel contact of this channel does not close so the lead in cable 76 which connects with the diode 272 is open circuited. When the positive Count 2 pulse occurs on lead 274 it finds a circuit through the open coil of relay 266 and the diode 268 to —V. However, the pulse on lead 274 can find no circuit through the open coil of relay 270 and diode 272 to —V because the star wheel contact for channel 6 is open. Thus, the contacts 266*a* are open by the Count 2 pulse but the contacts 270*a* remain closed. After a predetermined delay which is explained in greater detail subsequently, the red slides amplifier is turned on and its positive output signal is applied through the lead 220, slide solenoid 47–6, and the contacts 270*a* to —V thus energizing the slide solenoid 47–6. From this description it is seen that the only slide solenoids energized are those corresponding to the tape channels where no perforations are sensed.

It should be understood that although only two relays and their associated contacts are shown in FIG. 5 the red memory actually contains six relays with the contacts of the relays all being connected in parallel circuits between —V1 and the lead 220. Each of these parallel circuits also includes the coil of one of the six rotary slide solenoids 47 for controlling the operation of the slides associated with the red light valve.

The green and blue memories 262 and 264 are similar to the red memory described above. However, the open coils of the relays in the green memory are pulsed by Count 3 pulses whereas the open coils of the relays in the blue memory are pulsed by Count 4 pulses. The relay contacts associated with the green memory are included in circuits for energizing the six rotary slide solenoids in the green light valve and the blue memory relay contacts are in circuits for controlling the six rotary slide solenoids in the blue light valve.

DESCRIPTION OF COUNTER CIRCUIT—FIG. 6

FIG. 6 shows the details of the counter 58. The counter is an open-ended four stage counter including a first bistable stage 300, a second bistable stage 302, a third bistable stage 304, a fourth bistable stage 306 and a reset relay 308. The first, second, third, and fourth bistable stages each have a signal output lead designated Count 1, Count 2, Count 3, and Count 4, respectively. Pulses for advancing the counter are applied to the counter over a lead 56. Generally speaking, each pulse appearing on the lead 56 is directed to one of the output leads designated Count 1, Count 2, Count 3, and Count 4 depending upon the state of the counter at the time the pulse appears. At the same time that a pulse is directed to one of the output leads of a bistable stage it also passes into the bistable stage to set it in the On condition. As will become evident from the subsequent description, the stages are interlocked so that when one stage is turned on the preceding stage is turned off. A pulse which turns on the fourth stage 306 also energizes the relay 308. This relay has a single set of normally closed contacts 308*a* connected between the lead 62 and a junction 310. A count can be stored in the counter only as long as there is a positive holding voltage at the junction 310. Thus, when the relay 308 is energized the contacts 308*a* open thereby preventing the positive voltage on lead 62 from reaching the junction 310, and all stages of the counter return to their reset or off condition.

Bistable stage 300 includes a first relay 312 having a single coil and a second relay 314 having two coils X and Y.

Relay 312 has two sets of normally open contacts 312*a* and 312*b*. The contacts 312*b* are connected between lead 62 and OR gate 42 in FIG. 4A. The contacts 312*a* are connected to one end of the coil of relay 312 to provide a holding circuit for the relay as subsequently described. The relay 312 may be a conventional reed contact relay. When current flows through the relay coil the resulting magnetic field closes the contacts. When current no longer flows through the relay coil the contacts open.

Relay 314 is also a reed relay having permanent magnet biasing means. This relay has a set of normally open contacts 314*a* and a set of normally closed contacts 314*b*. The permanent magnet biasing means associated with the relay normally holds the contacts in these positions. The coils X and Y of the relay are oppositely wound so that when current flows through both coils simultaneously the resulting magnetic fields cancel out. Thus, the permanent magnet biasing means holds the contacts 314*b* in the position shown when current flows simultaneously through both coils X and Y. As subsequently explained, it is possible for current to flow through the coil X without current simultaneously flowing through the coil Y. When this occurs the magnetic field generated by current flowing through the coil X aids the permanent magnet bias thus closing the contacts 314*a* and overcomes the permanent magnet bias thus opening the contacts 314*b*. When current no longer flows through the coil X the permanent magnet bias again takes over again closing contacts 314*b*.

One end of coil Y is connected through a diode 316 to one end of coil X and the coil of relay 312. The other end of coil Y is connected through a diode 318 to the other end of coil X and from this point through a further diode 320 to —V and the other end of the coil of relay 312. Bistable stage 300 is turned on by applying a positive signal on the lead 322. This signal passes through coil Y, diode 318, and diode 320 to the negative side of the power supply. The signal also takes a parallel path through a second circuit which extends through diode 316, coil X, and diode 320 to the negative side of the power supply. Since the coils X and Y are oppositely wound the signal on lead 322 does not transfer the contacts of relay 314. However, the signal on lead 322 flows through a third circuit which extends from diode 316 through the coil of relay 312 to the negative side of the power supply. The signal flowing through the relay coil closes the contacts 312*a* and 312*b*. A positive holding voltage is normally present on lead 62 any time pulses are applied to the counter. When contacts 312*a* close this holding voltage causes a current to flow through the coil of relay 312 to the negative side of the power supply thus holding the contacts in the transferred position. The holding voltage also causes a current to flow through the coil X and diode 320 to the negative side of the power supply. Diodes 316 and 318 prevent this current from flowing through the coil Y. Therefore, the magnetic field produced by the current flowing through the coil X overcomes the permanent magnet bias associated with relay 314 and causes the contacts 314*a* and 314*b* to transfer. This condition represents the "on" or "set" state of stage 300. The stage 300 remains on until the positive holding voltage applied to the stage through the contacts 312*a* is removed.

A diode 324 is connected between the lead 322 and the negative side of the power supply. The purpose of this diode is to prevent current oscillations which might otherwise occur and cause the contacts of relay 314 to transfer inadvertently.

Bistable stages 302, 304, and 306 are identical to the stage 300 described above. However, the number of contacts associated with a particular relay may vary. Stage 302 includes a first relay 326 having a first set of normally open contacts 326*a* connected in the holding circuit for the stage and a second set of normally open contacts 326*b* connected between lead 62 and an input to OR gate 42 in FIG. 4A. The bistable stage 302 includes a second relay 328 having a set of normally closed contacts 328*a* connected between a junction 330 and a junction 332, a set of normally closed contacts 328*b* connected between junction 310 and the contacts 312*a*, and a set of normally open contacts 328*c* connected between the junction 330 and a junction 334.

Bistable stage 304 includes a first relay 336 having a set of normally open contacts 336*a* connected in the holding circuit for the stage and a set of normally open contacts 336*b* connected between lead 62 and an input to OR gate 42 in FIG. 4A. Bistable stage 304 also includes a second relay 338 having a set of normally closed contacts 338*a* connected between junction 330 and a junction 340, a set of normally open contacts 338*b* connected between the junction 340 and a junction 342, and a set of normally closed contacts 338*c* connected between a junction 344 and the contacts 326*a*.

Bistable stage 306 includes a first relay 346 having a set of normally open contacts 346*a* in the holding circuit of the stage, and a second relay 348 having a set of normally closed contacts 348*a* connected between a junction 350 and the relay contacts 336*a*.

A holding voltage on lead 62 is applied to the input of each bistable stage as long as the relay contacts 308*a* are closed. The holding circuit extends from lead 62 through contacts 308*a* to junction 310 and the input of stage 300; from junction 310 over a lead 352 to the junction 350 and the inputs to stage 304; from the junction 350 over a lead 354 to a junction 356 and the input to stage 306; and from junction 356 over a lead 358 to the junction 344 and the input to stage 302. A diode 360 is connected between junctions 342 and 344 and poled so as to prevent the holding voltage from feeding back to junction 342 to set stage 306 and energize relay 308. A lead 362 connects the junction 342 with relay 308 and an input to stage 306 so as to energize them when a pulse on lead 56 finds a circuit through the normally open contacts 338*b* to the junction 342.

COUNTER OPERATION AND FEEDBACK CIRCUIT

A feature of the invention is the novel arrangement whereby the clock 46 of FIG. 4A supplies pulses to advance the count in counter 58 and the counter controls the production of overlapping digital signals which are fed back to the clock so that the clock produces exactly the number of pulses required to step the counter through one complete cycle. This feature may be best understood by considering in detail the operation of the counter circuit shown in FIG. 6 in conjunction with the timing diagram of FIG. 7.

Assume that the counter is in a reset condition, the contact 14*a* (FIG. 4A) is closed and a delayed first cue pulse (subsequently explained) is applied to input lead 48 of the clock at time T100. The clock produces an output signal that passes through contacts 14*a*, over lead 56, contacts 338*a*, 328*a*, and 314*b* to become the Count 1 output signal from the counter. The first clock pulse also flows downwardly along lead 322, through diode 316 and the coil of relay 312 to the negative side of the line thus energizing relay 312. The clock pulse also flows through the coils X and Y but since these coils are oppositely wound the contacts of relay 314 are not transferred. However, the current passing through the coil of relay 312 causes the relay contacts 312*a* to close. A holding circuit is established when contacts 312*a* close. The holding circuit extends from the positive side of the power supply (FIG. 4A) through contacts 16*a* (now closed), contacts 22*a*, lead 62, contacts 308*a*, contacts 328*b*, contacts 312*a*, and the coil of relay 312 to the negative side of the power supply. At the time relay 312 is energized, the contacts 312*b* (FIG. 4A) close thus applying the positive voltage on lead 62 to the clock to keep it running.

When the contacts 312*a* close a circuit is also established through the coil X and the diode 320 to energize this coil and transfer the contacts of relay 314 when the Count 1 pulse terminates. Contacts 314*b* open to prevent the next pulse on lead 56 from reaching bistable stage 300 and the contacts 314*a* close to establish a circuit so that the next pulse on lead 56 may be directed to bistable stage 302.

The second clock pulse on lead 56 passes through contacts 338*a*, 328*a*, and 314*a*, to the junction 366. From this junction the clock pulse flows upwardly to become the Count 2 output from the counter. From junction 366 the second clock pulse also flows downwardly to energize the coil of relay 326. This occurs at time T109. When relay 326 is energized contacts 326*b* in FIG. 4A close to apply the positive voltage on lead 62 through the OR gate 42 to the clock. Contacts 326*a* close to establish a holding circuit for relay 326 and to energize the relay 328. This circuit extends from the positive voltage source (FIG. 4A) through relay contacts 16*a* and 22*a*, lead 62, contacts 308*a*, junction 310, lead 352, lead 354, junction 356, lead 358, contacts 338*c* and the contacts 326*a* to the bistable stage 302. From the contacts 326*a* parallel circuits are completed through the coil of relay 326 and the X coil of relay 328 to the negative side of the line. This energizes relay 328 upon termination of the Count 2 pulse and holds both this relay and relay 326. When relay 328 is energized the contacts 328*b* open thereby breaking the holding circuit for bistable stage 300. The relays 312 and 314 both return to normal when their holding circuit is broken. Thus, the contacts 312*b* in the input circuit to the counter open at approximately time T112, the exact time of occurrence being deterimned by the speed of operation of the relays.

When the relay 328 is energized the contacts 328*a* open so that the next clock pulse on the lead 56 cannot reach either bistable stage 300 or 302, and the contacts 328*c* close so that the next clock pulse may be directed to bistable stage 304.

The third clock pulse on lead 56 passes through contacts 338*a* and 328*c* to the junction 334. From this junction the clock pulse passes upwardly to become the Count 3 output signal from the counter. From junction 334 the third clock pulse also moves downwardly and through the coil of relay 336. The contacts 336*b* (FIG. 4A) transfer at time T118 to maintain a positive input through OR gate 42 to the clock. The contacts 336*a* close to establish a holding circuit for relay 336 and an energizing circuit for relay 338. The circuit extends from the positive side of the line (FIG. 4A) through contacts 16*a* and 22*a*, lead 62, contacts 308*a*, junction 310, lead 352, junction 350, contacts 348*a*, contacts 336*a*, and the coil of relay 336 to the negative side of the line. A parallel circuit for energizing the X coil of relay 338 upon termination of the Count 3 pulse extends from the contacts 336*a* and through the X coil to the negative side of the line. When the X coil of relay 338 is energized the contacts of the relay transfer. Contacts 338*a* open to prevent the next clock pulse on lead 62 from reaching either stage 300 or 304 and contacts 338*b* close so that the next clock pulse on lead 56 may be directed to bistable stage 306. The contacts 338*c* open thus breaking the holding circuit for relays 326 and 328 and the contacts associated with these relays return to their normal position at approximately T121. The contacts 326*b* in FIG. 4A open so that a positive voltage cannot be applied through these contacts and the OR gate to the clock. However, since the contacts 336*b* are now closed the positive voltage is applied through these contacts and the OR gate to the clock.

The fourth clock pulse on lead 56 energizes relay 346 of bistable stage 306. The circuit extends from lead 62 through contacts 338*b*, junction 342, lead 336, to junction 368. From junction 368 the clock pulse moves upwardly to become the Count 4 output signal from the counter. From junction 368 the clock pulse also moves downwardly and through the coil of relay 346. The contacts 346*a* close to establish a holding circuit for relay 346 and an energizing circuit for relay 348. This circuit extends from the positive side of the line (FIG. 4A) through contacts 16*a* and 22*a* and leads 352 and 354 to contacts 346*a* From contacts 346*a* parallel circuits extend through the coil of relay 346 and the X coil of relay 348 to the negative side of the power supply.

When relay 348 is energized the contacts 348*a* open thus breaking the holding circuit for bistable stage 304. The contacts of relays 336 and 338 in stage 304 return to normal at approximately T130. At this time the contacts 336*b* open the circuit between the positive voltage on lead 62 and the OR gate so that a positive voltage is no longer applied to the clock. This stops the clock.

Inspection of FIG. 7 shows that relays 312, 326, and 336 are energized during overlapping intervals of time between T100 and T130. Thus, there is a feedback from the counter to the clock to keep the clock running for slightly more than 30 milliseconds. The feedback signal many have a duration of from more than 27 to less than 36 milliseconds. This is sufficient time for the clock to produce four clock pulses of 3 milliseconds duration with each pulse being separated from the next one by six milliseconds, but is insufficient time for the clock to produce a fifth clock pulse.

The fourth clock pulse was applied to relay 308 at the same time it was applied to stage 306. When relay 308 is energized the contacts 308*a* open thus removing the holding voltage for stage 306. The relays 346 and 348 in this stage remain energized by the fourth clock pulse and when the clock pulse terminates these relays return to the de-energized condition. A capacitor 349 is charged by the clock pulse and when the pulse terminates the capacitor discharges through the coil of relay 308 thus holding the relay energized long enough to insure drop-out of all counter relays. The relay 308 then drops out and at this point the counter is again in its reset condition. The cycle may be repeated by applying another input pulse to the clock 46.

CIRCUIT OPERATION—FGS. 4A AND 4B

The mode of operation of the control circuits of FIGS. 4A and 4B will now be described in conjunction with the timing diagram of FIG. 7.

Assume that an operator has loaded one reel holding the negative and another reel holding the raw film stock into the film strip printer, and placed a correctly punched program tape into the perforated tape reader. As will be evident from the following description the relay contacts 10*a* are open and the relay contacts 12*a* are closed, the contacts having been placed in this condition by an unlatch pulse applied to the relays 10 and 12 during some preceding printing operation. All other relay contacts are in the position shown in the drawing.

The operator starts the printer control circuits by depressing the start button to close start switch contacts 32A. Closure of the start switch contacts esetablishes a circuit from +V through contacts 70*a*, contacts 28*a*, contacts 30*a*, contacts 32A, contacts 18*a* and lead 36 to the close coil of relay 10 and the open coil of relay 12. These relays are energized thus closing the contacts 10*a* and opening the contacts 12*a*.

When the start switch contacts 32A close a circuit is also established for applying a positive voltage to the clock 46. This circuit extends from +V through contacts 70*a*, contacts 28*a*, contacts 30*a*, start switch contacts 32A, contacts 18*a*, diode 38, and OR circuit 42 to the input lead 44 of the clock. As long as the start switch is closed the positive voltage on the input of the clock keeps the clock running and it produces a sequence of clock pulses to advance the tape in the tape reader to a position where the star wheel contacts sense the Start-8 hole in the tape. The clock pulses pass through amplifier 52 and contact 66*a* to the escapement solenoid 68 so that each clock pulse advances the tape one step.

The relay contacts 14*a* at the output of amplifier 52 are open so the clock pulses cannot reach the counter 58. Furthermore, since the tape leader contains no perforations the AND gate 77 is not conditioned to pass the clock pulses. Thus, the only thing accomplished by the clock pulses is the step-by-step advance of the tape in the tape reader.

Each clock pulse advances the tape one step and at some point the clock pulse advances the tape to the position containing a Start-8 hole. The channel 8 star wheel drops into the hole and the associated star wheel contact closes thus connecting —V through the star wheel contact, lead 76–8, and contacts 66*d* to one input of AND gate 77. The dotted line in FIG. 7 shows the interval of time during which the star wheel contact is closed. This conditions the AND gate so that the next succeeding clock pulse passes through the AND gate and appears on lead 78 as the Start-8 pulse. The Start-8 pulse passes through diode 60 and over lead 56 to the counter 58. The pulse filters through the relay contacts in counter 58 and becomes the Count 1 pulse at the output of the counter. Also, the pulse applied to the counter energizes the relay 312 in the first stage 300 of the counter thus closing the contacts 312*b* connected between the lead 62 and OR gate 42.

The Start-8 pulse appearing at the output of AND gate 77 also passes through the discriminator circuit 80, diode 84, relay contacts 10*a* to the lead 86 to energize the close coils of relays 14, 16, and 20 and the open coil of relay 18.

When relay 18 is energized the contacts 18*a* open thus disabling the start switch contacts 32A. Since the relays 10 and 12 are bistable the opening of contacts 18*a* has no effect on these relays. The opening of contacts 18*a* also removes the positive voltage applied to the clock 46 through lead 40 and OR gate 42. However, the same pulse which energizes relay 18 to open the contacts 18*a* also energizes relay 16 to close the contacts 16*a*. A circuit is established from +V through contacts 16*a*, contacts 22*a*, lead 62, counter relay contacts 312*b* (now closed), and OR gate 42 to the clock 46. This keeps the clock running.

It should be noted that the Count 1 output of the counter is applied over lead 81 and through OR gate 42 to the clock. This pulse assures that a positive signal is continuously applied to the input of the clock in the event that the contacts 18*a* open before the contacts 16*a* close.

Relays 14 and 20 are energized by the same pulse that energizes relays 16 and 18. The contacts 14*a* close so that subsequent clock pulses appearing at the output of amplifier 52 are applied directly to the input of the counter. The contacts 20*a* close thus establishing a circuit from +V1 through stop switch contacts 97A, contacts 20*a*, and relay 26 to —V1. This energizes relay 26 thus closing the contacts 26*a* and establishing a circuit from +V1 through stop switch contacts 97A, contacts 26*a* and relay 28 to —V1. This circuit energizes relay 28 causing the contacts 28*a* to open in the start switch circuit.

Relays 26 and 28 have additional contacts not shown which are located in the circuits of the film strip printer. When the relays 26 and 28 are energized these contacts close thus applying power to the motors which drive the negative and the raw film stock through the film strip printer.

Before the actual printing operation can begin sufficient time must be allowed for the motors to accelerate the negative and the raw film stock to the normal printing speed of 240 f.p.m. The Start-8 pulse from AND gate 77 which energizes relays 14, 16, 18, and 20 also initiates a 100 millisecond delay. The output signal from the AND gate passes through discriminator 80, and over lead 83 into FIG. 4B where it energizes the close coil of relay 150. The contacts **150*a* close thus applying a positive voltage to the 100 millisecond delay element 160. This circuit may be traced backward from the delay element through contacts 150*a*, lead 164, lead 166 into FIG. 4A, lead 62, contacts 22*a*, and contacts 16*a*** to +V. the 100 millisecond delay is identified in FIG. 7 as the first cue delay.

During this interval the data read from the tape is applied to the light valves and the light valves store the data so that the vanes may be set immediately upon termination of the 100-millisecond interval.

The first Count 1 pulse produced by the counter 58 passes over lead 118 to the red, green, and blue memories to reset the memories. As explained above with reference to FIG. 5, the Count 1 pulse is applied to the close coil of each relay in each memory thus closing the contacts (FIG. 5) associated with these relays.

The Count 1 pulse on lead 118 is also applied to the close coil of relay 152 thus closing the contacts **152*a* and applying a positive signal to the 40 millisecond delay element 162. The circuit for the positive signal is from +V (FIG. 4A) through contacts 16*a*, contacts 22*a*, lead 62, lead 166, lead 164, and contacts 152*a*, to the input of delay element 162**.

Delay element 162 does not produce an output signal until 40 milliseconds after the positive voltage is applied thereto. During this 40 millisecond interval clock pulses appearing at the output of amplifier 52 pass through contacts **14*a* and over lead 56 to advance the counter 58 to successive counts 2, 3, and 4. The clock pulses are also applied through relay contact 66*a* to the escapement solenoid 68** to advance the tape in the tape reader.

The same clock pulse that passed through AND gate 77 because of the presence of an 8 hole in the tape also energized the escapement solenoid 68 so as to advance the tape. When the tape advances certain of the star wheel contacts 74 close depending upon the perforations in the tape signifying red correction data for scene 1. See FIG. 2. Each star wheel contact that closes applies −V over a lead in the cable 76 to the red, green, and blue memories.

The next clock pulse appearing at the output of amplifier 52 is applied through contacts **66*a*** to the escapement solenoid to initiate another tape advance. However, before the actual escapement takes place several things occur.

First, the same clock pulse that initiates the tape advance passes from the output of amplifier 52 through contacts **14*a* and over lead 56, and filters through relay contacts of the counter 58 to become the Count 2 pulse. This pulse is applied to the open coil of each of the relays in the red memory. As previously explained with reference to FIG. 5, the count pulse finds a circuit to −V through the open coil of a memory relay and the star wheel contact for a particular channel if there is a perforation in that channel. This opens the contacts (such as contacts 226*a* and 270*a*) associated with these relays. However, if a particular channel contains no perforation the Count 2 pulse does not find the circuit through the corresponding memory relay and the relay remains closed thus connecting one end of the corresponding rotary slide solenoid to −V1**. The slide solenoid is not energized at this time because the slide amplifier is not producing a positive output signal.

The second clock pulse which filtered through the counter to become the Count 2 pulse also advances the count in the counter. The second stage 302 of the counter is turned on and this turns off the first stage 300. When stage 302 is turned on the relay contacts **326*b* in FIG. 4A close thus connecting the positive voltage on lead 62 through the OR gate 42 to the clock to keep it running. When stage 300 is turned off the relay contacts 312*b*** open.

Subsequent to these operations and before the next clock pulse occurs the actual escapement and advance of the tape occurs so that the star wheel contacts now sense the perforations relating to the green correction data.

The third clock pulse appearing at the output of amplifier 52 is applied through contacts **66*a* to the escapement solenoid to again pulse the escapement magnet. As before, the tape is read and the counter is advanced before the actual escapement occurs. The clock pulse appearing at the output of amplifier 52 passes through contacts 14*a*, over lead 56 and through the counter circuits to become the Count 3 output pulse of the counter. This pulse is applied to the relays in the green memory to open those relays corresponding to the channels having perforations relating to green correction data. This operation is the same as that described above for setting the red memory relays, the only difference being that the green correction data is stored in the green memory relays during Count 3 whereas the red correction data was stored in the red memory relays during Count 2**.

The same pulse applied to the counter to become the Count 3 pulse turns on the third stage 304 of the counter and this turns off the second stage 302. When stage 304 is turned on the relay contacts **336*b* in FIG. 4A close thus providing a circuit for applying the positive voltage on lead 62 through the OR gate 42 to the clock. When stage 302 is turned off the contacts 326*b*** open.

Subsequent to these actions and before the next succeeding clock pulse, the actual escapement in tape movement occurs so that the line of perforations relating to the blue correction data is located under the star wheels.

The fourth clock pulse appearing at the output of amplifier 52 is applied through the contact **66*a* to energize the escapement solenoid 68. Before the actual tape movement takes place the clock pulse also passes through relays contacts 14*a* and over lead 56 to the counter 58. The clock pulse filters through the relay circuits of the counter and emerges as the Count 4 output pulse of the counter. The Count 4** pulse is applied to the open coil of each of the relays in the blue memory and opens those relays corresponding to those channels of the tape having perforations relating to the blue correction data.

The fourth clock pulse applied to the counter turns on the fourth stage 306 and this turns off the third stage 304. When stage 304 is turned off the contacts **336*b* in FIG. 4A are opened. At this point there is no positive voltage applied to the input of the clock 46** so the clock stops producing output pulses.

At the same time stage 306 of the counter is turned on, the clock pulse which turns on this stage also energizes the relay 308. The contacts **308*a* in the upper left portion of FIG. 4 open thus breaking the holding circuit for all stages of the counter. When the holding circuit is broken stage 306** is reset so that the counter again resets and contains a count of zero.

Referring to FIG. 7, it is seen that the feedback from the counter to the clock pulse generator, through the relay contacts **312*b*, 326*b*, and 336*b* lasts from the time the first Count 1 pulse is generated to a zero until after the first Count 4 pulse is generated. The duration of this feedback signal is slightly more than 30 milliseconds. Once the feedback signal is terminated the clock stops and nothing further happens for approximately seven milliseconds. At this time the 40 millisecond delay element in FIG. 4B produces a positive output signal, the leading edge of which is differentiated in differentiator circuit 198 and applied to the slide pulse generator 202 and the unlatch pulse generator 206**.

The slide pulse generator produces an output signal to energize the relay 156 thus closing the relay contacts **156*a*. When the contacts 156*a* close the voltage —V is applied through the contacts to the red, green, and blue slides amplifiers. Each of these amplifiers produces a positive output signal to energize one or more slide solenoids in each of the light valves depending upon which of the relay contacts in the memories 260, 262, and 264** are closed.

Referring to FIG. 5, the output of the red slides amplifier appears on the lead 220 and is applied to each of the slide solenoids in the red memory. If any of the relay contacts (such as **266*a* and 270*a*) in the red memory are closed then the output signal from the red slides amplifier finds a circuit through the corresponding red slide solenoid and the relay contact to —V1**.

Similar circuits are established from the green and blue slides amplifier through various ones of the relay contacts in the green and blue memories. Since the red, green, and blue slides amplifiers are all energized simultaneously, the slide solenoids in each of the red, green and blue light valves is energized simultaneously provided the relay memory contacts are closed.

The slide solenoids that are energized pull the slide associated therewith into a latching position. Simultaneously with the beginning of the slide pulse the unlatch pulser produces an output signal that is amplified and applied over lead 244 to the unlatch solenoid in each of the light valves. The unlatch solenoid in the red light valve unlatches all the red slides and those whose slide solenoid is not energized are returned to a normal position by the rotary slide solenoid return spring 47. Actually, the slides that return are those that were energized and unlatched on some preceding print operation but are not energized at the present time. In like manner, the unlatch solenoid in the green light valve unlatches the green slides and those green slides whose solenoids are not energized are returned to normal by the slide solenoid return springs. The unlatch solenoid in the blue light valve unlatches the blue slides so that they may be returned to a normal position if their solenoids are not energized.

The unlatch pulse lasts only 15 milliseconds whereas the slide pulse lasts for 30 milliseconds. When the slide pulse terminates all those slides whose solenoids were energized remain in the latched position since the unlatch pulse has terminated and the unlatch mechanism is again in latching position. As the slides moved into the latching position the ball-type adder unit in each light valve expanded or contracted depending upon the particular slide solenoids energized. As discussed in connection with FIGS. 3A–3C, this linear movement is transferred into angular movement of the vane cam 39 in each light valve.

To summarize the operations to this point, the clock responded to depression of the start button by producing a sequence of output signals to step the tape in the tape reader to a point where the Start-8 hole in the tape was sensed. A Start-8 pulse was generated which initiated a first cycle during which certain control relays were set and a 100 millisecond delay initiated. The Start-8 pulse also entered the counter 58 to set the counter to Count 1. Because of the feedback circuit from the counter to the clock the clock was kept running until it produced three clock pulses subsequent to the clock pulse that sensed the presence of an 8 hole in the tape. Each of these clock pulses advanced the tape in the tape reader one step and advanced the count in the counter by one. Correction data relating to scene 1 was read from the tape and entered into the red, green, and blue memories under control of the count pulses produced by the counter. Slides in the light valves 184, 186, and 188 were unlatched and certain slide solenoids were energized in accordance with the data entered in the red, green, and blue memories. Movement of the slides rotated the vane cam in each of the light valves by an amount corresponding to the data read from the tape. However, the vanes 11, 13, and 15 (FIG. 1) were not set because the vane solenoids in the light valves were not pulsed. The control circuits are at rest waiting for termination of the 100 millisecond delay interval.

Approximately 100 milliseconds after the Start-8 hole is sensed the control circuits begin a second cycle of operations during which the vanes 11, 13, and 15 are set in accordance with the vane cam position, and the correction data relating to scene 2 is read from the tape to set the vane cam to a new position.

The signal applied to delay element 160 at time T0 causes the element to produce an output signal at time T100. This signal is an automatic first cue signal. It passes through OR gate 168 and is differentiated at 172 to trigger vane pulser 176. The vane pulser produces a vane signal of 30 milliseconds duration and this signal is applied through amplifier 180 to the vane solenoid in each of the light valves. As explained with reference to FIGS. 3B and 3C, when a vane solenoid 55 is energized it attracts an armature 57 which carries rollers 59. These rollers seek the low point on the camming surface of the vane cam thus rotating the armature. The gear sector on the armature acts through gears to rotate a set of vanes to a desired setting as determined by the angular position of the vane cam.

The signal which energizes the vane solenoids is also applied to the coil of relay 154 thus opening the normally closed contacts **154*a*. The purpose of these contacts is subsequently explained. The signal applied to the vane solenoids is also applied to the open coil of relay 150 thus opening the contacts 150*a***. This prevents further pulses from passing through the 100 millisecond delay element.

The automatic first cue signal is also applied to the clock 46. The circuit is from delay element 160 through OR gate 168, contacts **154*a*, and lead 48 to the clock. The clock starts running and produces a first output signal that passes through relay contacts 14*a* to the counter 58. The clock pulse passes through the counter circuits to become the Count 1 output of the counter and is also applied to the first stage 300 in the counter to turn this stage on. Once the counter is turned on the counter relay contacts 312*b*, 326*b*, and 336*b* apply a positive voltage through OR gate 42 to the clock so that the clock produces a total of four output pulses and then stops. Each clock pulse energizes the escapement solenoid in the tape reader to advance the tape one step. Before escapement takes place in response to the first clock pulse the Count 1 output pulse from the counter energizes the close coil of the relays in the red, green, and blue memories thus resetting these memories. The Count 1 pulse also energizes the close coil of relay 152 thus closing the contacts 152*a* and applying a positive signal to the 40 milliseconds delay element 162**.

Before the tape advances in response to the second, third, and fourth clock pulses the Count 2, Count 3, and Count 4 output signals from the counter gate the red, green, and blue correction data read from the tape into the red, green, and blue memories respectively.

At the end of the 40 millisecond delay interval delay element 162 produces an output signal that is differentiated at 198 and applied to the unlatch pulser and the slide pulser. These pulsers produce the unlatch and slide signals which are used in the same manner as the previous cycle to energize and latch certain slides in each of the light valves thereby rotating the vane cam in each of the light valves by an amount corresponding to the correction data for scene 2 now stored in the memories.

Up to this point all of the operations described have taken place automatically once the start button was depressed. The vanes 11, 13, and 15 have been set in accordance with the correction data relating to scene 1 and the drive motors are driving the negative and raw film stock through the printer so that successive frames of scene 1 are being printed. The data relating to scene 2 has been read from the tape, transferred to the red, green, and blue memories and subsequently used to set the vane cam 39 in each light valve. These conditions are maintained for an indeterminate period of time depending upon the number of frames in scene 1.

As previously stated, the negative contains cue notches indicating changes from one scene to the next. There is one notch between the last frame of scene 1 and the first frame of scene 2, between the last frame of scene 2 and the first frame of scene 3, and so forth. After the last frame of scene 1 is printed the microswitch 69 in FIG. 1 senses a cue notch thus closing the contacts 250 in FIG. 4B. A circuit is established from +V in FIG. 4A through contacts **16*a*, contacts 22*a*, lead 62, lead 166, the cue switch contacts 250, run switch contacts 32B, OR circuit 168, and contacts 154*a* to the junction 170. This cue signal initiates another cycle of operation identical with cycle 2 as illustrated in FIG. 7. The cue signal is differentiated and applied to the vane pulser 176 and the vane pulser produces an output signal to the vane solenoid in each of the light valves. As previously described, this causes the vanes 11, 13, and 15 to be set in accordance with the angular position of the vane cam, that is, in accordance with the correction data relating to scene 2**.

The cue pulse also passes over lead 48 into FIG. 4A where it pulses the clock 46. The clock produces a sequence of four output pulses to step the tape reader 72 and advance the counter 58. As the counter and tape reader are advanced the correction data relating to scene 3 is read from the tape and utilized to set the vane cams in the light valves. The printing of successive frames of scene 2 continues until the next cue notch is sensed on the negative at which time another identical cycle of operations is initiated.

As shown in FIG. 7, a period of approximately 70 milliseconds elapses between the time a cue signal is received to start a cycle of operation, and the completion of the slide signal. This is the minimum time required to advance the tape reader four steps, read the correction data from the tape, and set the vane cams in accordance with this data. The relay contacts **154*a*** are for the purpose of locking out cue signals so that they cannot occur more often than at approximately 80 millisecond intervals.

As previously explained, each cue notch on the negative closes the microswitch 250 thus establishing a circuit through OR gate 168 and differentiator 172 to trigger vane pulser 176. The vane pulser produces a thirty millisecond vane pulse that is amplified by amplifier 180 and applied over lead 182 and through diode 192 to immediately energize the relay 154. The same signal passes through resistor 230 and resistor 236 to charge capacitor 238. Relay contacts **154*a*** open to prevent further cue signals from triggering the vane pulser and the clock.

Relay 154 is a slow release relay and does not transfer contacts **154*a* to the closed position immediately upon termination of the vane signal. When the vane signal is terminated the charge on capacitor 238 discharges through diode 234 and the coil of relay 154 to hold the relay energized for at least 10 milliseconds following termination of the vane signal. As shown in FIG. 7, the slide signal begins exactly 10 milliseconds after termination of the vane signal. The slide signal at the output of the green slides amplifier is applied through diode 228 and resistor 194 to energize the coil of relay 154 before the contacts 154*a* can return to the closed position. This slide signal also charges the capacitor 238. Upon termination of the slide signal the capacitor discharges through the diode 232 to hold the relay 154 energized for a period of time after the slide signal terminates. As shown in FIG. 7, the relay 154 is energized for an interval of approximately 80 milliseconds following each cue pulse. Thus, the relay contacts 154*a*** will block any cue pulse that occurs within 80 milliseconds after a preceding cue pulse.

The printing operation can be stopped in any one of a number of ways. The normal mode of stopping the printing operation is by an eight hole punched in the tape in the Count 1 position following the correction data for the last scene to be printed. After the last frame of the last scene is printed the cue notch microswitch 69 in FIG. 1 senses a notch thus closing the cue notch contacts 250 in FIG. 4B. A positive voltage is applied through the switch contacts 250, start switch contacts 32B, OR gate 168, contacts **154*a*, and lead 148 to the clock 46. The clock being running and the first clock signal produced at the output of amplifier 52 conditions AND gate 77 which is further conditioned at this time by the −V signal applied to it through the channel 8 star wheel contact. The AND gate produces a positive output signal that flows through the discriminator 80 and the diode 84 to the contacts 10*a* and 12*a*. The relay 10 is open and the relay 12 is closed at this time, having been energized by the first unlatch pulse which occurred 40 milliseconds after the start button was depressed. The positive signal passes through contacts 12*a* (now closed) to lead 88. The signal flows through the open coil of relays 14, 16, and 20 and the close coil of relay 18**.

Relay contacts **14*a* open thus preventing further clock pulses from reaching the counter 58. The relay contacts 16*a* open thus removing the holding voltage applied to the counter and the feedback voltage necessary for keeping the clock running. This resets the counter and stops the clock. The contacts 18*a* close to reconnect OR gate 42 and relays 10 and 12 to stop switch contacts 32**A.

The relay contacts **20*a* open thus breaking the circuit between +V1 and the relay 26. Relay 26 drops out thus opening the contacts 26*a* and the holding circuit for relay 28. Contacts 28*a* close thus completing a circuit to restart the control circuits if the start button 32A is depressed. At the same time relays 26 and 28** drop out, they operate contacts in the control circuits for the drive motors which drive the negative at the raw film stock thus stopping these motors.

A printing operation can be stopped at any time by depressing a stop button to operate stop switch contacts 97A and 97B. When the stop button is depressed the contacts 97A open thus allowing relays 26 and 28 to drop out. As described above, this opens contacts **26*a* and closes contacts 28*a*** while at the same time de-energizing the motors which drive the negative and the raw film stock.

When the stop switch button is depressed the contacts 97B close thus establishing a circuit from +V through the coil of relay 30. Contacts **30*a* open so as to render the start switch inactive as long as the stop switch is operated. Contacts 30*b* close establishing a circuit from +V through diode 110, capacitor 106, and diode 90, to the lead 88. From this lead the positive voltage is applied to the open coils of relays 14, 16, and 20 and the close coil of relay 18 to transfer these V contacts of these relays. As previously explained, contacts 14*a* open to prevent clock pulses from reaching the counter, the contacts 16*a* open to remove the feedback voltage and counter holding voltages, and contacts 18*a* close to establish a circuit between the start switch contacts 32A and the relays 10 and 12**.

As soon as the stop switch is released the contacts 97A and 97B return to normal. The relay 30 drops out thus opening the contacts **30*b* and closing the contacts 30*a***.

The printing operation may also be stopped if the tape reader gets out of step with the counter. As shown in FIG. 2, there should be no punches in channels 1 through 7 of the tape for those positions corresponding to Count 1 of the counter. The star wheel contacts are connected through cable 76 to OR gate 114 which produces a negative output signal any time any one or more of the channel 1 through 7 star wheels senses a hole in the tape. This negative signal is applied to the base input of the transistor AND gate 116 and each Count 1 output from the counter is applied over lead 118 to the emitter of the transistor AND gate. If a perforation is present in any one of the channels 1 through 7 when the counter produces a Count 1 pulse the AND gate 116 produces an output signal on lead 122 to close relay 24 and open relay 22.

The relay contacts 22*a* open thus removing the positive voltage from the holding input to the counter 58 and also removing the positive voltage in the feedback circuits to the clock 46. This clears the counter 58 and stops the clock 46.

The contacts 24*a* close thus establishing a circuit from +V through the contacts 24*a* and diode 100 to energize the relay 30. The contacts 30*a* open to inactivate the start switch. The contacts 30*b* close thus forming a circuit from +V through the contacts 30*b*, diode 110, capacitor 106, and diode 90 to the lead 88. The positive voltage on lead 88 opens relays 14, 16, and 20 and closes relay 18.

The contacts 14*a* open to prevent clock pulses from reaching the counter, the contacts 16*a* open so that the holding voltage cannot be applied to lead 62 until the start switch is again depressed. The contacts 20*a* open thus dropping out relay 26 and the contacts 26*a* open to drop out relay 28. This de-energizes the drive motors for the negative and the raw film stock.

At this point the machine is locked up and cannot be restarted because the contacts 30*a* are open in the circuit between +V and the start switch contacts 32A.

The printing operation may not be resumed until the sequence reset button is depressed. When the sequence reset button is depressed the contacts 124 of the sequence reset switch transfer thus discharging capacitor 126 through the close coil of relay 22 and the open coil of relay 24. The contacts 22*a* close but do not activate any elements because the contacts 16*a* are now open. The contacts 24*a* open thus breaking the circuit from +V to the coil of relay 30. The relay 30 drops out thus closing the contacts 30*a* in the circuit to the start switch contacts 32A. After the out of sequence condition has been corrected the printing operation may be resumed.

It should be noted that the 100 millisecond delay is initiated only in response to a Start-8 hole which closes relay 150. Thus, this 100 millisecond delay does not occur when the start button is depressed to restart a printing operation that has been stopped by depression of the stop button or by occurrence of an out-of-sequence condition. Thus, if the printer is stopped for any reason the perforated tape must be reloaded in the tape reader and the printing operation restarted from the beginning.

From the preceding description it is seen that the present invention provides a control circuit which permits faster printing speeds than heretofore possible when using light valves of the type described in combination with a control tape. The invention provides means for reading a set of correction data and simultaneous setting of all three light valves by simultaneously pulsing each of the unlatch solenoids and simultaneous but selectively pulsing the slide solenoids in accordance with the data read from the tape. The correction data is held in the light valve during the printing of one scene and is immediately available to set the light vanes for printing the next scene upon the occurrence of a cue signal. To further speed up the operation, the tape reader is actuated by the cue signal so that the reading of the next set of correction data takes place concurrently with the positioning of the light vanes in accordance with the preceding set of correction data.

Although a specific embodiment of the invention has been described herein to illustrate certain novel features, it will be understood that various modifications and substitutions may be made in the form and detail of the device described without departing from the spirit of the invention. For example, the invention may employ tape readers for reading magnetic optical or other indicia rather than perforations. The cue signals on the negative may be in the form of magnetic light reflecting, transparent, or other indicia rather than notches cut in the negative. Any or all relay functions may be performed by solid state devices. Other modifications will be evident. It is intended therefore to be limited only by the scope of the appended claims.

The embodiments of the invention in which an exclusive property or privilege is claimed are defined as follows:

1. In a film strip printer having red, green, and blue light valves controlled by red, green, and blue correction data recorded in sets on a tape, the improvement comprising:
  means for reading said red, green, and blue correction data of one of said sets during first, second, and third non-concurrent intervals of time,
  means responsive to said reading means for storing said red, green, and blue correction data,
  and means for subsequently and simultaneously setting said red, green and blue light valves in response to the red, green and blue correction data stored in said storing means.

2. The improvement as claimed in claim 1 and further comprising:
  red, green, and blue vanes positionable in response to said red, green, and blue light valves,
  cue signal generating means,
  and means responsive to said cue signal generating means for applying a signal to each of said light valves to thereby position said vanes in accordance with said one set of red, green, and blue correction data read from said tape.

3. The improvement as claimed in claim 2 and further comprising:
  means responsive to said cue signal generating means for controlling said reading means whereby said reading means reads another of said sets of correction data during the interval said vanes are set in accordance with said one set of correction data.

4. In a film strip printer of the type having first, second, and third light valves for controlling first, second and third vanes in accordance with correction data read from a tape, the improvement comprising:
  clock pulse generator means for producing a sequence of clock pulses,
  a tape reader having means therein responsive to each of said clock pulses for advancing said tape one step,
  counter means responsive to said clock pulses for sequentially producing first, second, third and fourth control pulses,
  means in said tape reader for sensing correction data from said tape,
  first, second, and third memory means responsive to said second, third, and fourth control pulses, respectively, and to said sensing means, for storing data sensed from said tape,
  means for applying said first control pulse to said memory means to reset said memory means prior to the entry of data therein,
  means responsive to said counter for initiating a signal,
  means for delaying said signal until after said data has been stored in said memory means,
  first, second, and third mechanical means in said first, second and third light valves, respectively,
  and means responsive to said memory means and said delayed signal for setting said first, second and third mechanical means in accordance with the data stored in said first, second, and third memory means.

5. The improvement as claimed in claim 4 wherein:
  each of said light valves includes means responsive to a vane signal for setting said first, second, and third vanes in accordance with the settings of said first, second, and third mechanical means, and said improvement further comprises:
cue signal generator means,
and means responsive to said cue signal generator means for starting said clock pulse generator and producing said vane signal.

6. The improvement as claimed in claim 5 and further comprising:
feedback means responsive to said counter for keeping said clock pulse generator running until it has produced four clock pulses in response to each signal from said cue signal generator means.

7. In a film strip printer, the combination comprising:
means for generating clock pulses,
a tape reader having means responsive to each clock for advancing a tape in said reader.
said reader having means for sensing indicia from said tape,
start circuit means for conditioning said clock pulse generator to produce clock pulses whereby said tape is advanced,
means responsive to said clock pulses and said sensing means for producing a start signal when a predetermined indicia is sensed from said tape,
control circuit means,
counter means,
means for applying said start signal to said counter and said control circuit means,
said control circuit means including first means for rendering said start circuit means inactive and second means for applying said clock pulses to said counter,
and means responsive to said counter means and said control circuit means for conditioning said clock pulse generator to produce a predetermined number of clock pulses subsequent to the production of said start signal.

8. The combination as claimed in claim 7 and further comprising:
means in said counter means for sequentially producing first, second, third, and fourth pulses in response to four clock pulses, said counter means including automatic reset means for resetting said counter after each fourth clock pulse,
said counter, when reset, inactivating said feedback means to stop said clock pulse generator,
delay means for delaying a signal applied thereto for a time greater than that required to produce four clock pulses,
means responsive to said start signal and said control circuit means for applying a signal to said delay means,
and means responsive to said delay means for restarting said clock pulse generator.

9. The combination comprising:
clock pulse generator means for producing clock pulses as long as a conditioning signal is applied thereto,
counter means,
means for applying said clock pulses to said counter means to advance the count therein,
means controlled by said counter for applying a conditioning signal to said clock pulse generator as long as said counter means is not reset,
circuit means in said counter means for resetting said counter means in response to each clock pulse which advances said counter means to its maximum count,
and means for applying a conditioning pulse to said clock pulse generator means to start said generator means and said counter means.

10. The combination as claimed in claim 9 wherein said counter comprises first, second, third, and fourth bistable relay stages each controlling a plurality of relay contacts,
circuit means interconnecting said contacts whereby each clock pulse applied to said counter passes said circuit means to become an output pulse from said counter,
said means controlled by said counter comprising a voltage source and three parallel circuits connecting said source to said clock pulse generator, said parallel circuits including first, second, and third sets of normally open contacts controlled by said first, second and third bistable relay stages, respectively.

11. In a film strip printer operating under the control of a program tape of the type having correction data characters made up of a plurality of indicia recorded in rows transverse to the direction of tape movement with the first and every Nth row of the tape having no data recorded thereon, said indicia also being recorded in a plurality of channels extending in the direction of tape movement, the improvement comprising:
clock pulse generator means for producing a sequence of N clock pulses,
a tape reader including
means responsive to each clock pulse for advancing said tape one row,
and a plurality of indicia sensors, one for sensing indicia in each of said channels,
a counter having first through Nth output terminals,
means for applying said clock pulses to said counter to increase the count therein, said counter producing output signal at one of said output terminals in accordance with the count contained therein,
means responsive to said plurality of indicia sensors for producing a first signal when any of said sensors sense indicia in any of said channels,
and means responsive to the concurrent presence of said first signal and an output signal at the first terminal of said counter for signalling an out of sequence condition.

12. The improvement claimed in claim 11 wherein said last-named means includes means for stopping said clock pulse generator.

13. A film strip printer including,
three light valves each having
adder means having a plurality of solenoid actuated slides and linearly expandible in response to actuation of said slides,
vane cam means rotatable over a range of angular positions, in response to expansion of said adder means,
and solenoid-actuated means for sensing the angular position of said vane cam means and setting the position of a light vane as determined by said angular position,
cue signal generator means,
clock pulse generating means responsive to each cue signal for generating a sequence of four clock pulses,
a tape reader having
means responsive to each clock pulse for advancing a tape one step,
and means for sensing correction data from said tape,
a counter responsive to said clock pulses for producing first, second, third and fourth count pulses,
first, second and third means responsive to said second, third and fourth count pulses and said sensing means for storing indications of correction data sensed from said tape,
a delay means for delaying a signal applied thereto for at least as long as said sequence of clock pulses,
fourth means responsive to said first count pulse for applying a signal to said delay means,
fifth means responsive to said first, second and third means for selectively applying a first voltage to said slide solenoids,
sixth means responsive to each cue signal for energizing the solenoid-actuated means in each light valve to set the positions of said vanes,
and seventh means responsive to said delay means for applying a second voltage to each slide solenoid in each of said light valves.

14. A film strip printer as claimed in claim 13 wherein:

said first, second, and third means each comprise a plurality of bistable relays, said fifth means comprising a plurality of sets of normally open contacts, each said set of contacts being connected between said first voltage and one end of a slide solenoid, said seventh means comprising means to apply said second voltage to the other end of each of said slide solenoids, said printer further comprising means responsive to said first count pulses for setting all said bistable relays and closing said contacts, said relays being independently reset upon concurrent application thereto of a second, third, or fourth count pulse and a signal from said sensing means.

15. A film strip printer as claimed in claim 14 wherein each of said bistable relays includes a reset coil, said count pulses and said signals from said sensing means being applied to opposite ends of said coils.

References Cited

UNITED STATES PATENTS

| | | | |
|---|---|---|---|
| 2,943,554 | 7/1960 | Kastner | 355—88 |
| 2,971,448 | 2/1961 | Baumbach et al. | 355—88 |

NORTON ANSHER, Primary Examiner

R. A. WINTERCORN, Assistant Examiner

U.S. Cl. X.R.

352—92; 355—88